United States Patent [19]

Shaw

[11] 4,013,044
[45] Mar. 22, 1977

[54] REARING UNITS
[75] Inventor: John Charles Michael Shaw, Saltfleetby-St-Peter, England
[73] Assignee: Spotmanor Limited, Lincolnshire, England
[22] Filed: Feb. 26, 1975
[21] Appl. No.: 553,190
[30] Foreign Application Priority Data
Feb. 28, 1974 United Kingdom ............ 09207/74
[52] U.S. Cl. .................................. 119/16; 119/21
[51] Int. Cl.² ........................................ A01K 1/00
[58] Field of Search ............... 119/15, 16, 17, 18, 119/21, 34, 33, 39, 40, 48
[56] References Cited
UNITED STATES PATENTS

| 893,737 | 7/1908 | Koons | 119/21 X |
| 1,096,708 | 5/1914 | Furley | 119/34 X |
| 1,328,810 | 1/1920 | Beaman | 119/16 |
| 1,814,979 | 7/1931 | Taylor | 119/16 X |
| 2,335,173 | 11/1943 | Corey | 119/21 |
| 3,098,465 | 7/1963 | Ivey | 119/16 X |
| 3,888,211 | 6/1975 | Allen | 119/21 X |

*Primary Examiner*—J.N. Eskovitz
*Attorney, Agent, or Firm*—John C. Smith, Jr.

[57] ABSTRACT

An animal rearing unit enabling early weaning comprises a rectangular body with a cage or cages inside it, with air inlet means at one end of said body and air outlet means at the opposite end. A controlled temperature air heating device is provided in a preheating chamber at the inlet end of said body.

16 Claims, 5 Drawing Figures

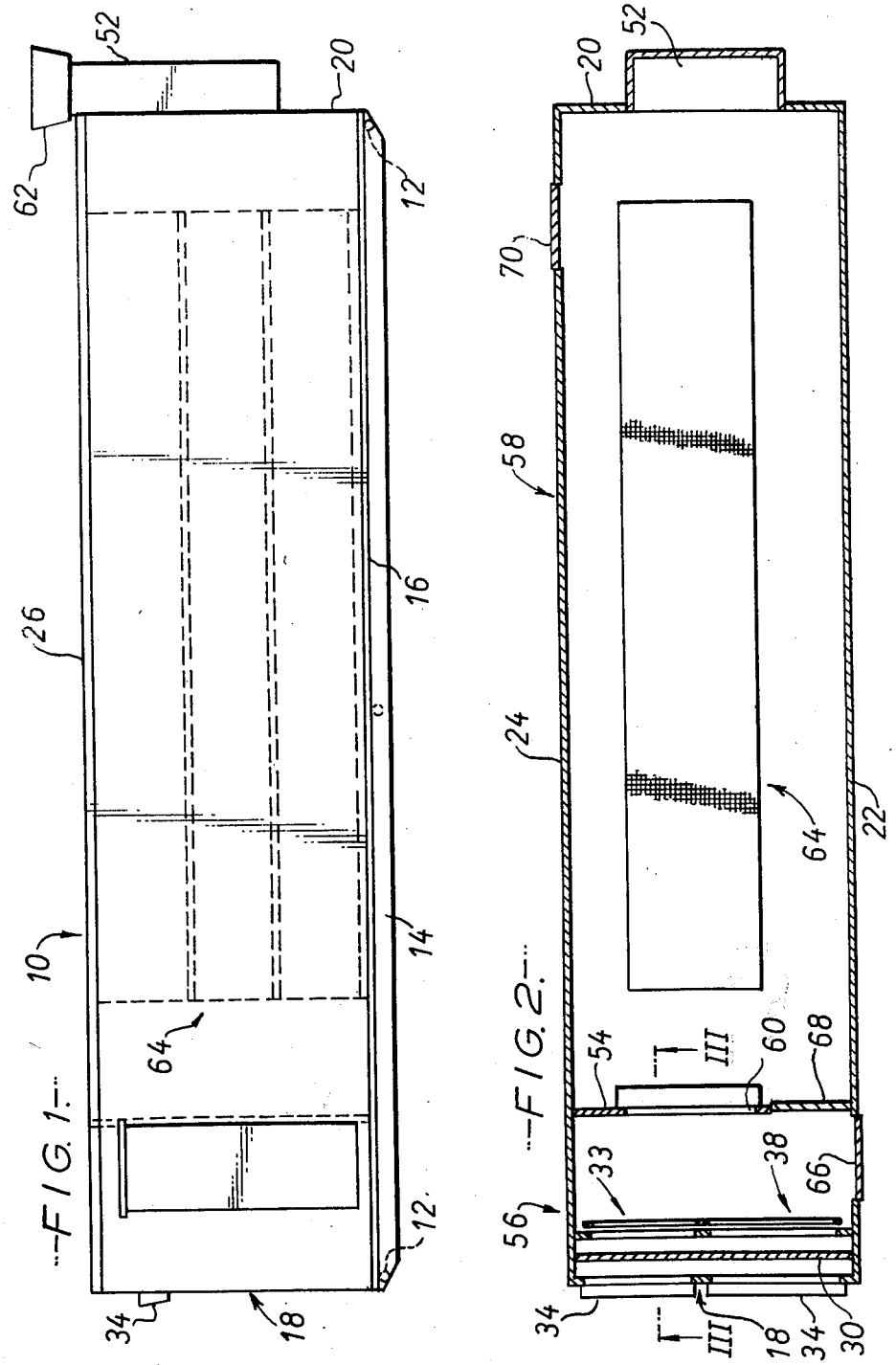

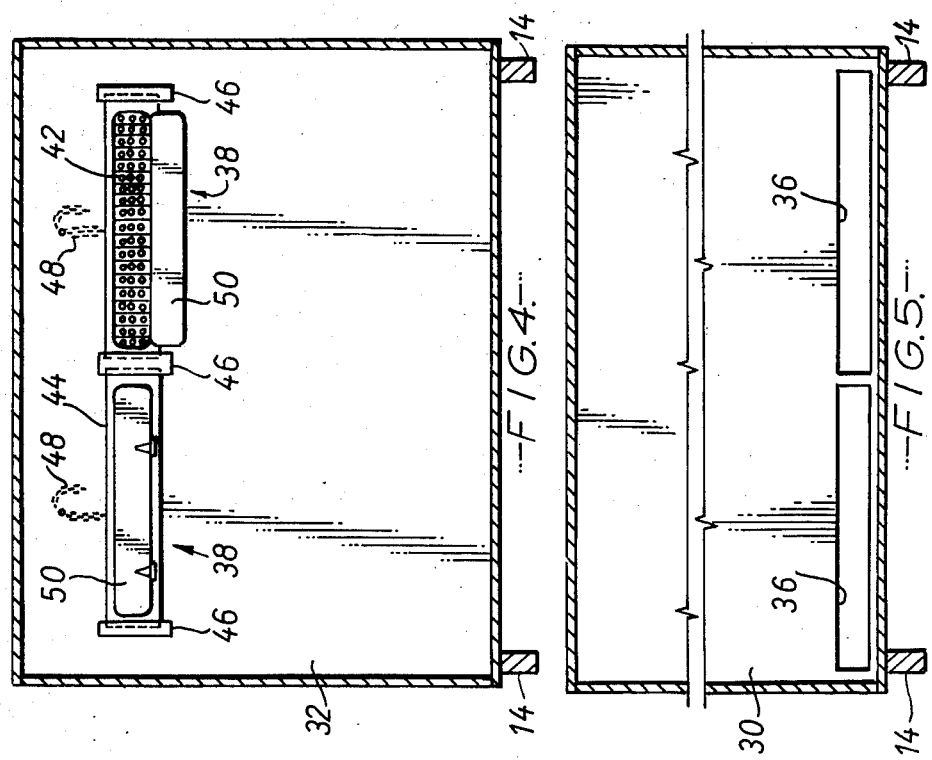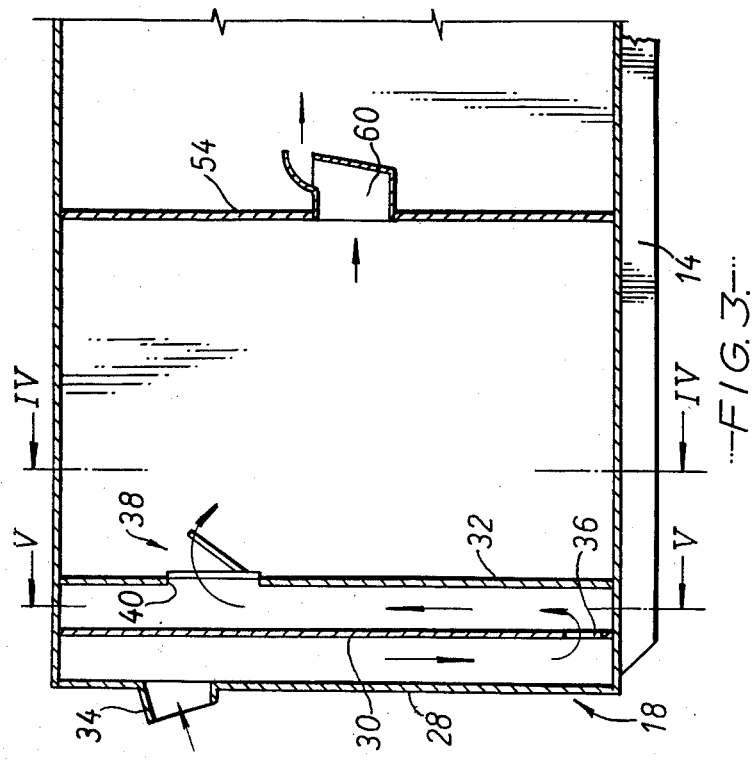

REARING UNITS

This invention relates to rearing units for farm animals and more particularly but not exclusively to a rearing unit for animals such as piglets.

It has been found under normal farm conditions to be difficult to wean piglets until some 5 weeks after farrowing without incurring unacceptable losses of the animals. The object of this invention is to provide a rearing unit which enables animals such as piglets to be weaned at an earlier age than in the usual farm conditions.

According to this invention, a rearing unit for farm animals comprises a substantially rectangular body having one or more cages mounted therein for containing the animals, air extraction means mounted at or adjacent to one end of the body for withdrawing air from the unit, and air inlet means provided at or adjacent to the other end of the body through which air is drawn into the unit.

Preferably, heating means is provided for heating the air which is drawn into the unit and the heating means and/or the air extraction means may be controlled by a temperature sensing device mounted in the portion of the body having the or each cage mounted therein. The heating means is, preferably, mounted in a preheating chamber formed at the end of the body having the air inlet means provided therein.

A partition wall which extends transversely between the two side walls of the body can be provided adjacent to the end of the body having the air inlet means provided therein to form the preheating chamber and one or more apertures and/or grilles may be formed in the partition wall to allow heated air to be drawn from the preheating chamber into the portion of the body having the or each cage mounted therein. Preferably, a first door is formed in the partition to provide access to the portion of the body containing the or each cage from the preheating chamber and a second door may be formed in the wall of the body to allow access to the preheating chamber from the exterior of the body.

A number of cages can be provided which extend for a major portion of the length of the body between the partition and the end of the body having the air extraction means mounted therein and the cages may be arranged in one or more tiers. The cages are, preferably, formed at least partly of wire to allow air to flow freely therethrough and may have a metal floor provided with a plurality of apertures to allow animal excreta to pass therethrough. A tray can be mounted beneath the floor of each cage to collect the animal excreta and conduit means may be connected to the tray to conduct the excreta to the exterior of the unit. Preferably, also, each cage is provided with a feeding trough which may extend along one side of the cage.

Preferably, the air extraction means comprises one or more fans for withdrawing air from the unit and expelling the air into the atmosphere, and the or each fan may be electrically operated. The air extraction means preferably expels air from the unit into the atmosphere through a cowling which is adapted to resist the reverse flow of air therethrough from the atmosphere into the unit.

A preferred embodiment of this invention will now be described, by way of example only, with reference to the accompanying drawings in which:

FIG. 1 is a side elevation of a rearing unit;

FIG. 2 is a partly sectioned plan view of the rearing unit;

FIG. 3 is a section on the line III—III in FIG. 2 to an enlarged scale;

FIG. 4 is a section on the line IV—IV in FIG. 3; and

FIG. 5 is a section on the line V—V in FIG. 3.

Referring now to the drawings, a unit for rearing animals such as piglets comprises a rectangular body indicated generally at 10 which is mounted on a metal chassis 12 having two spaced-apart longitudinally extending skid members 14. The unit is capable of being moved slidably on the skid members 14 to enable it to be located in a required position on for example a concrete base (not shown).

The body 10 of the unit comprises a rectangular wooden floor 16 having two wooden end wall assemblies 18, 20 and two wooden side walls 22, 24 extending upwardly from the edges of the floor 16 and a wooden roof 26 extending between the upper edges of the end wall assemblies 18, 20 and the side walls 22, 24.

Referring now particularly to FIGS. 3, 4 and 5 of the drawings, the end wall assembly 18 comprises three spaced-apart parallel wooden panels 28, 30 and 32. The external wooden panel 28 of the assembly 18 extends between the floor 16 and the roof 26 and has two air intake grilles 34 formed in the upper portion thereof. The central panel 30 of the assembly 18 also extends between the floor 16 and the roof 26, and two spaced-apart apertures 36 are formed in the panel 30 adjacent to the floor 16. The internal panel 32 of the assembly 18 extending between the floor 16 and the roof 26 has two adjustable air inlets indicated generally at 38 formed in the upper portion thereof.

Each air inlet 38 comprises an aperture 40 formed in the panel 32 in which is located an insert 42 formed of material having a plurality of small diameter holes formed therein to allow air to flow therethrough, and a frame 44 which is mounted for sliding movement in two spaced-apart slides 46 from the position shown in FIG. 4 where the frame 44 covers the aperture 40 to a position in which the aperture 40 is substantially completely uncovered. The frame 44 is supported in adjusted position by means of a chain 48 which is connected between the frame 44 and a mounting hook (not shown) secured to the panel 32. The frame 44 is also provided with a hinged door 50 which can be moved from the "closed" to the "open" position as shown in FIG. 4 to uncover the major portion of the aperture 40 to allow the maximum flow of air therethrough.

An air extraction unit 52 is mounted on the end wall assembly 20 and comprises one or more electrically operated fans (not shown) which are adapted when operated to withdraw air from the interior of the body 10. The removal of air from the body 10 by the extraction unit 52 causes air to flow through the inlet grilles 34 into the space between the external panel 28 and the central panel 30 of the end wall assembly 18. The air flows downwardly through the space between the panels 28 and 30, through the apertures 36 in the lower portion of the panel 30 adjacent to the floor 16, upwardly between the central panel 30 and the internal panel 32 and into the body 10 through the air inlets 38 in the upper portion of the panel 32.

A partition wall 54 is mounted in the body 10 and extends transversely between the two side walls 22, 24 at a position adjacent to the end wall assembly 18, to divide the interior of the body 10 into a preheating chamber indicated generally at 56 and a portion 58 for housing the piglets which are to be reared. An air inlet aperture 60 is formed in the partition wall 54 so that when air is withdrawn from the portion 58 of the body 10 by the extraction unit 52, replacement air is drawn through the intake grilles 34 in the end wall assembly 18, as hereinbefore described, passes through the chamber 56 and enters the portion 58 of the body 10 through the aperture 60 in the wall 54. One or more propane gas-fired heaters (not shown) is or are mounted in the preheating chamber 56 each such heater being adapted to heat the air which is drawn through the chamber 56 prior to the air entering the portion 58 of the body 10. The or each propane gas-fired heater and the air extraction unit 52 are both controlled by a thermostat (not shown) mounted in the preheating chamber 56 in accordance with signals from a temperature sensing device (not shown) in the portion 58 of the body 10, so that a substantially constant temperature is maintained in the portion 58 while the extraction unit 52 withdraws sufficient air therefrom to change the air in this portion 58 of the unit approximately 7 times each hour. The air inlets 38 are adjusted so that the apertures 40 in the panel 32 are uncovered by adjustment of the frames 44 and/or the doors 50 to allow sufficient air to flow therethrough to achieve the required rate of flow of air through the body 10. In addition, the extraction unit 52 expels air into the atmosphere through a cowling 62 which pevents the reverse flow of air through the unit 52 and thus prevents draughts occurring in the portion 58 of the body 10.

A series of cages indicated generally at 64 are mounted in the portion 58 so as to extend longitudinally of this portion 58 between the end wall assembly 20 and the partition wall 54. The cages 64 are arranged in 3 or more tiers and have sides formed of wire to allow the free passage of air therethrough. Each cage 64 has a floor formed of expanded metal sheet which allows the animal excreta to pass therethrough into a tray (not shown) secured beneath the floor of the cage 64 and a pipe (not shown) is connected to the or each tray to enable liquid excreta to pass therethrough to the exterior of the unit. A feeding trough (not shown) is also provided on each cage 64 and extends for the full length of one side of the associated cage.

Access to the preheating chamber 56 from the exterior of the unit is provided through a first door 66 in the side wall 22 and admittance to the portion 58 of the body 10 from the chamber 56 is provided through a second door 68 in the partition wall 54. In addition, direct access from the exterior of the unit to the portion 58 of the body 10 is provided through a third door 70 in the side wall 24. The withdrawal of air from the portion 58 of the unit by the air extraction unit 52, the supply of air into the unit through the end wall assembly 18, and cowling 62 preventing the reverse flow of air through the unit 52 enable the air in the unit to be changed with the minimum of air disturbance which has been found to be beneficial to the rearing of piglets. The piglets which are housed in the cages 64 are thus maintained in controlled conditions of air flow and air temperature and this controlled environment enables the piglets to be weaned at an earlier age after farrowing than piglets housed in conventional uncontrolled conditions without unacceptable losses of animals occurring.

I claim:

1. A rearing unit for farm animals comprising a substantially rectangular body having a pair of spaced side walls, bottom and top walls extending between said side walls and a pair of end walls extending between said side, bottom and top walls at opposite ends thereof and having at least one cage mounted therein for containing said animals, power-operated air exhaust means mounted in one of said end walls for withdrawing air from the unit and air inlet means provided at the opposite of said end walls through which air may be drawn into said unit by said power-operated air exhaust means, said at least one cage being located in said unit between said air inlet means and said one end wall and said air inlet means including a first panel spaced interiorly from said opposite end wall isolating the space therebetween and a second panel spaced interiorly from said first panel isolating the space therebetween, said end wall, first panel and second panel each having an aperture therein, said apertures being arranged out of horizontal alignment to provide a substantially U-shaped path through said inlet means to restrict the flow of air therethrough into said at least one cage and control the volume of air withdrawn from said unit by said power-operated air exhaust means.

2. A rearing unit according to claim 1 wherein heating means is provided for heating the air drawn into said unit.

3. A rearing unit according to claim 2 further comprising a temperature sensing device mounted in the portion of the body having said cage mounted therein, said temperature sensing device being arranged to control said heating means.

4. A rearing unit according to claim 2 further comprising a partition wall extending transversely between said two side walls of the body and spaced from said opposite end wall of the body forming a pre-heating chamber, said pre-heating chamber containing heating means and said partition wall including air inlet means whereby the air flowing through said pre-heat chamber may be heated.

5. A rearing unit according to claim 4 wherein a first door is formed in one of said side walls to provide access to the portion of the body containing said cages.

6. A rearing unit according to claim 5 wherein a second door is formed in one of said side walls to allow access to said pre-heating chamber.

7. A rearing unit according to claim 6 wherein a plurality of cages are provided which extend for a major portion of the length of the body between said pre-heating chamber and end wall having said air exhaust means mounted therein.

8. A rearing unit according to claim 7 wherein said cages are arranged in tiers.

9. A rearing unit according to claim 1 wherein each cage is formed at least partly of wire to allow air to freely flow therethrough.

10. A rearing unit according to claim 1 wherein each cage has a metal floor provided with a plurality of apertures to allow animal excretion to pass therethrough.

11. A rearing unit according to claim 10 wherein a tray is mounted beneath the floor of each cage to collect the animal excreta.

12. A rearing unit according to claim 11 wherein conduit means is connected to the tray to conduct exceta collected in the tray to the exterior of the unit.

13. A rearing unit according to claim 1 wherein each cage is provided with a feeding trough extending along one side of the cage.

14. A rearing unit according to claim 1 wherein said air exhaust means comprises at least one fan for withdrawing air from the unit and expelling the air into the atmosphere.

15. A rearing unit according to claim 14 wherein said fan is electrically operated.

16. A rearing unit according to claim 1 wherein said air exhaust means comprises a cowling adapted to resist the reverse flow of air therethrough from the atmosphere into said unit.

* * * * *